US010751722B1

(12) United States Patent
Pearson et al.

(10) Patent No.: US 10,751,722 B1
(45) Date of Patent: Aug. 25, 2020

(54) SYSTEM FOR PROCESSING CANNABIS CROP MATERIALS

(71) Applicant: PEARSON INCORPORATED, Sioux Falls, SD (US)

(72) Inventors: Alex Pearson, Sioux Falls, SD (US); Roy Olson, Sioux Falls, SD (US); Casey Van Middendorp, Harrisburg, SD (US); Joshua Tracy, Harrisburg, SD (US)

(73) Assignee: Pearson Incorporated, Sioux Falls, SD (US)

( * ) Notice: Subject to any disclaimer, the term of this patent is extended or adjusted under 35 U.S.C. 154(b) by 0 days.

(21) Appl. No.: 16/654,919

(22) Filed: Oct. 16, 2019

Related U.S. Application Data

(60) Provisional application No. 62/749,755, filed on Oct. 24, 2018.

(51) Int. Cl.

| | |
|---|---|
| ***B02C 4/00*** | (2006.01) |
| ***B02C 4/02*** | (2006.01) |
| ***B02C 4/28*** | (2006.01) |
| ***B02C 4/42*** | (2006.01) |
| ***A24B 1/04*** | (2006.01) |
| ***A24C 5/39*** | (2006.01) |
| ***A24C 5/42*** | (2006.01) |

(Continued)

(52) U.S. Cl.
CPC .................. *B02C 4/02* (2013.01); *A24B 1/04* (2013.01); *A24C 5/39* (2013.01); *A24C 5/42* (2013.01); *B02C 4/286* (2013.01); *B02C 4/42* (2013.01); *B02C 23/10* (2013.01); *B02C 23/16* (2013.01); *B02C 2023/165* (2013.01)

(58) Field of Classification Search
CPC .. B02C 4/02; B02C 4/42; B02C 4/286; A24B 1/04; A24C 5/39; A24C 5/42
USPC ........................... 241/235, 223, 224, 225, 73
See application file for complete search history.

(56) References Cited

U.S. PATENT DOCUMENTS

| | | | |
|---|---|---|---|
| 254,974 | A | 3/1882 | Hollingsworth |
| 288,743 | A | 11/1883 | Swingle |
| 417,836 | A | 12/1889 | Ponsar |

(Continued)

FOREIGN PATENT DOCUMENTS

| | | |
|---|---|---|
| CA | 2665876 | 11/2010 |
| CA | 3012914 | 10/2018 |

(Continued)

OTHER PUBLICATIONS

Charles Stark and Julie Kalivoda, "Evaluating Particle Size of Feedstuffs", publication, Nov. 2016, 4 pages, K-State Research and Extension, Kansas State University Agricultural Experiment Station and Cooperative Extension Services, Manhattan, Kansas.

*Primary Examiner* — Faye Francis
(74) *Attorney, Agent, or Firm* — Jeffrey A. Proehl; Woods, Fuller, Shultz & Smith, PC

(57) ABSTRACT

A system for grinding material in a material flow through the system may include a feed hopper having an interior for receiving material to be processed, a feed apparatus configured to receive material of the material flow from the feed hopper and control a feed rate of the material moving through the system, a roller mill apparatus configured to grind material of the material flow passing through the roller mill apparatus, and a classifier apparatus configured to remove portions of the material from the material flow.

20 Claims, 7 Drawing Sheets

(51) Int. Cl.
*B02C 23/10* (2006.01)
*B02C 23/16* (2006.01)

(56) References Cited

U.S. PATENT DOCUMENTS 454,950 A 6/1891 Sewell
473,957 A 5/1892 Pollock
621,744 A 3/1899 Bowden
664,836 A 1/1901 Davidson
738,166 A 9/1903 Davidson
744,567 A * 11/1903 Krusemark ............. B02C 17/06 241/78
1,466,508 A 8/1923 Lake
1,568,267 A 1/1926 Carter
1,611,675 A 12/1926 Prestemon
1,678,134 A 7/1928 Cromer
2,053,038 A * 9/1936 MacKenzie .............. D01B 1/02 209/355
2,118,010 A * 5/1938 Hazle, Jr. ................ A47J 42/38 241/13
2,608,973 A * 9/1952 Coons .................... A01D 45/24 460/114
2,614,597 A * 10/1952 Magnus .................. B02C 18/00 241/73
3,226,041 A 12/1965 Graumann
3,304,355 A 2/1967 Pobst, Jr.
3,321,079 A * 5/1967 Sackett, Sr. ............. B07B 1/522 209/38
3,362,649 A 1/1968 Odden
3,491,952 A * 1/1970 Krolopp .................. B02C 4/286 241/13
3,683,559 A 8/1972 Kalwaites
3,752,315 A 8/1973 Hubach
3,866,842 A * 2/1975 Linzberger .............. B02C 4/286 241/47
4,083,501 A * 4/1978 Ryan ....................... A01F 29/00 241/101.762
4,165,280 A * 8/1979 Holley ..................... D01G 9/16 198/550.8
4,177,900 A 12/1979 Kluthe
4,202,629 A 5/1980 Jakobs
4,213,855 A 7/1980 Vonbennigsen-Mackiewicz
4,361,476 A 11/1982 Brewer
4,387,552 A 6/1983 Lancaster
4,442,876 A 4/1984 Koike
4,468,265 A 8/1984 MacLaughlin
4,572,216 A * 2/1986 Josuttis .................... A24C 5/42 131/70
4,645,484 A 2/1987 Niske
4,786,001 A 11/1988 Ephraim
4,862,570 A 9/1989 Bald
4,941,290 A 7/1990 Holyoke
4,986,997 A 1/1991 Posner
5,042,728 A * 8/1991 Haque ....................... B02C 4/06 241/235
5,044,115 A 9/1991 Richardson
5,052,088 A 10/1991 Hagewood
5,100,062 A * 3/1992 Baltensperger ........... B02C 4/06 241/9
5,115,984 A 5/1992 Satake
5,192,028 A 3/1993 Curran
5,201,470 A 4/1993 Baltensperger
5,251,144 A 10/1993 Ramamurthi
5,315,789 A 5/1994 Takashi
5,366,167 A 11/1994 McCarthy
5,392,998 A 2/1995 Suessegger
5,419,107 A 5/1995 Shelbourne
5,501,629 A 3/1996 Kawana
5,523,701 A 6/1996 Smith
5,533,371 A 7/1996 Frischknecht
5,547,136 A * 8/1996 Steffens ................ B02C 18/142 241/160
5,597,125 A * 1/1997 Bouldin ................ A01F 29/005 241/136
5,622,323 A * 4/1997 Krueger ................. A01K 5/002 241/101.76
5,632,135 A 5/1997 Baker, IV
5,717,209 A 2/1998 Bigman
5,846,129 A 12/1998 Dragt
6,016,626 A 1/2000 Auer
6,176,683 B1 1/2001 Yang
6,199,777 B1 3/2001 Satake
6,258,308 B1 7/2001 Brady
6,293,478 B1 * 9/2001 Livrieri ..................... B02C 4/06 241/11
6,365,416 B1 4/2002 Elsohly
6,372,281 B1 4/2002 Metzger
6,375,104 B1 * 4/2002 Hruska ................. A01F 29/005 241/189.1
6,443,376 B1 9/2002 Huang
6,517,016 B1 2/2003 Feige
6,589,598 B2 7/2003 Ochiai
6,634,577 B2 * 10/2003 Horigane .................. B02C 4/06 241/235
6,730,519 B2 5/2004 Elsohly
6,886,763 B2 * 5/2005 Lepage ................ A01D 87/122 241/194
6,990,431 B2 1/2006 Beaudoin
7,006,953 B2 2/2006 Takemura
7,032,850 B2 * 4/2006 Fukui ...................... B02C 13/02 241/159
70,835,344 8/2006 Goransson
7,170,251 B2 1/2007 Huang
7,183,735 B2 2/2007 Heinemann
7,198,215 B2 * 4/2007 Everson .................... B02C 4/08 241/242
7,206,719 B2 4/2007 Lindsay
7,381,017 B2 6/2008 Wang
7,419,694 B2 9/2008 Korolchuk
7,425,344 B2 9/2008 Korolchuk
7,540,697 B2 1/2009 Wang
7,568,641 B2 8/2009 Dreimann
7,592,468 B2 9/2009 Goodwin
7,756,678 B2 7/2010 Bonissone
7,757,980 B2 * 7/2010 Oare ..................... A01F 29/005 241/101.76
7,832,241 B2 11/2010 Mantovan
8,144,005 B2 3/2012 Hu
8,162,243 B2 * 4/2012 Wenthe ................... B02C 4/286 241/159
8,206,061 B1 6/2012 Hansen
8,211,341 B2 7/2012 Lustiger
8,292,207 B2 * 10/2012 Fard .......................... B02C 4/02 241/222
8,343,553 B2 1/2013 Hospodor
8,485,052 B2 7/2013 Gebhart
8,690,087 B2 4/2014 Roll
8,734,143 B2 5/2014 Morris
8,842,267 B2 9/2014 Heine
9,066,910 B2 6/2015 Rosenblatt
9,104,650 B2 8/2015 Hosek
9,510,507 B1 12/2016 Abbott
9,592,457 B2 3/2017 Dabao
9,649,349 B1 5/2017 Tucker
9,651,467 B2 5/2017 Deguchi
9,694,040 B2 7/2017 Scialdone
9,723,786 B2 8/2017 Brummelhuis
9,744,200 B1 8/2017 Tucker
9,795,338 B2 10/2017 Kang
9,797,822 B2 10/2017 Little, III
9,801,956 B2 10/2017 Kularatne
9,804,092 B2 10/2017 Zeng
9,808,538 B2 11/2017 Kularatne
9,919,315 B2 3/2018 Pearson
9,959,514 B2 5/2018 Phan
9,974,821 B2 5/2018 Kennedy
10,143,706 B2 12/2018 Kotra
10,322,487 B1 6/2019 Hansen
10,399,082 B1 9/2019 Pearson
2002/0022899 A1 2/2002 Dehy
2002/0168911 A1 11/2002 Tonner
2003/0117426 A1 1/2003 Schmidt

(56) References Cited

U.S. PATENT DOCUMENTS

| | | | | |
|---|---|---|---|---|
| 2004/0096585 | A1 | 5/2004 | Bonnebat | |
| 2006/0073258 | A1 | 4/2006 | Korolchuk | |
| 2006/0231021 | A1 | 10/2006 | Friske | |
| 2007/0170291 | A1 | 7/2007 | Naganawa | |
| 2007/0209347 | A1 | 9/2007 | Malmros | |
| 2007/0294121 | A1 | 12/2007 | Galt | |
| 2008/0063330 | A1 | 3/2008 | Orlowski | |
| 2008/0167483 | A1 | 7/2008 | Whittle | |
| 2008/0191075 | A1* | 8/2008 | Bon | A01G 23/093 241/235 |
| 2008/0203956 | A1 | 8/2008 | Cohen | |
| 2008/0275660 | A1 | 11/2008 | Bhateja | |
| 2009/0093191 | A1 | 4/2009 | Glide | |
| 2009/0295561 | A1 | 12/2009 | Hu | |
| 2010/0030926 | A1 | 2/2010 | Boussy | |
| 2010/0059609 | A1 | 3/2010 | Teeter | |
| 2010/0127217 | A1 | 5/2010 | Lightowlers | |
| 2011/0067374 | A1 | 3/2011 | James | |
| 2011/0113740 | A1 | 5/2011 | Desmarais | |
| 2011/0276828 | A1 | 11/2011 | Tamaki | |
| 2012/0005107 | A1 | 1/2012 | Lowden | |
| 2012/0046352 | A1 | 2/2012 | Hospodor | |
| 2012/0244266 | A1 | 9/2012 | Ku | |
| 2013/0087644 | A1 | 4/2013 | Ephraim | |
| 2013/0271110 | A1 | 10/2013 | Yamanaka | |
| 2013/0301375 | A1 | 11/2013 | Stephan | |
| 2014/0014748 | A1 | 1/2014 | Zeeck | |
| 2014/0048459 | A1 | 2/2014 | Hafford | |
| 2014/0145018 | A1 | 5/2014 | Niklewski | |
| 2014/0245799 | A1 | 9/2014 | Kim | |
| 2014/0299688 | A1 | 10/2014 | Carbonini | |
| 2015/0027096 | A1 | 1/2015 | Black | |
| 2015/0129698 | A1 | 5/2015 | Olson | |
| 2015/0156967 | A1 | 6/2015 | Steenland | |
| 2015/0211971 | A1 | 7/2015 | Little, III | |
| 2015/0300800 | A1 | 10/2015 | Van Valkenburgh | |
| 2015/0324759 | A1 | 11/2015 | Bansal | |
| 2015/0346717 | A1 | 12/2015 | Hosek | |
| 2016/0100524 | A1 | 4/2016 | Young | |
| 2016/0120123 | A1 | 5/2016 | Brummelhuis | |
| 2016/0245588 | A1 | 8/2016 | Baugh | |
| 2016/0374386 | A1 | 12/2016 | Desmarais | |
| 2017/0027105 | A1 | 2/2017 | Wenger | |
| 2017/0080466 | A1 | 3/2017 | Godwin | |
| 2017/0131194 | A1 | 5/2017 | Little, III | |
| 2017/0333257 | A1 | 11/2017 | Schmitz | |
| 2017/0333809 | A1 | 11/2017 | Lopa | |
| 2018/0035610 | A1 | 2/2018 | Wieker | |
| 2018/0126578 | A1 | 5/2018 | Raichart | |
| 2018/0213722 | A1 | 8/2018 | Pratt | |
| 2019/0124840 | A1 | 5/2019 | Bates | |
| 2019/0276420 | A1 | 9/2019 | Cho | |

FOREIGN PATENT DOCUMENTS

| | | |
|---|---|---|
| CN | 101401506 | 6/2012 |
| CN | 202873360 | 4/2013 |
| CN | 103430692 | 12/2013 |
| CN | 103497823 | 1/2014 |
| CN | 104194920 | 12/2014 |
| CN | 204907202 | 12/2015 |
| CN | 205030140 | 2/2016 |
| CN | 105594370 | 5/2016 |
| CN | 108064545 | 5/2018 |
| CN | 108076804 | 5/2018 |
| CN | 207385669 | 5/2018 |
| CN | 108624394 | 10/2018 |
| CN | 108718676 | 11/2018 |
| CN | 108811715 | 11/2018 |
| CN | 108633454 | 12/2018 |
| CN | 109363026 | 2/2019 |
| DE | 2737115 | 3/1979 |
| DE | 2807634 | 8/1979 |
| DE | 19627137 | 1/1998 |
| DE | 102005055373 | 5/2007 |
| EP | 0383410 | 8/1990 |
| EP | 1195668 | 9/2002 |
| EP | 1757181 | 2/2007 |
| EP | 2556740 | 2/2013 |
| FR | 2885009 | 11/2006 |
| GB | 7360922 | 8/1955 |
| GB | 973177 | 10/1964 |
| JP | 2010201440 | 9/2010 |
| RU | 2119737 | 10/1998 |
| WO | 9419970 | 9/1994 |
| WO | 2005119089 | 12/2005 |
| WO | 2007066847 | 6/2007 |
| WO | 2007133098 | 11/2007 |
| WO | 2009128711 | 10/2009 |
| WO | 2010082322 | 7/2010 |
| WO | 2010130035 | 11/2010 |
| WO | 2013160576 | 10/2013 |
| WO | 2017051398 | 3/2017 |
| WO | 2018014135 | 1/2018 |
| WO | 2019041017 | 3/2019 |
| WO | 2019119153 | 6/2019 |
| WO | 2019157783 | 8/2019 |

* cited by examiner

SYSTEM FOR PROCESSING CANNABIS CROP MATERIALS

REFERENCE TO RELATED APPLICATIONS

This application claims the benefit of U.S. Provisional Patent Application No. 62/749,755, filed Oct. 24, 2018, which is hereby incorporated by reference in its entirety.

BACKGROUND

Field

The present disclosure relates to crop processing systems and more particularly pertains to a new system for processing cannabis crop materials for grinding relatively unprocessed crop materials that may include leaves, stems, and buds, such as harvested cannabis materials.

SUMMARY

The present disclosure relates to a system for grinding material in a material flow through the system, and which may include a feed hopper having an interior for receiving material to be processed, a feed apparatus configured to receive material of the material flow from the feed hopper and control a feed rate of the material moving through the system, a roller mill apparatus configured to grind material of the material flow passing through the roller mill apparatus, and a classifier apparatus configured to remove portions of the material from the material flow.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
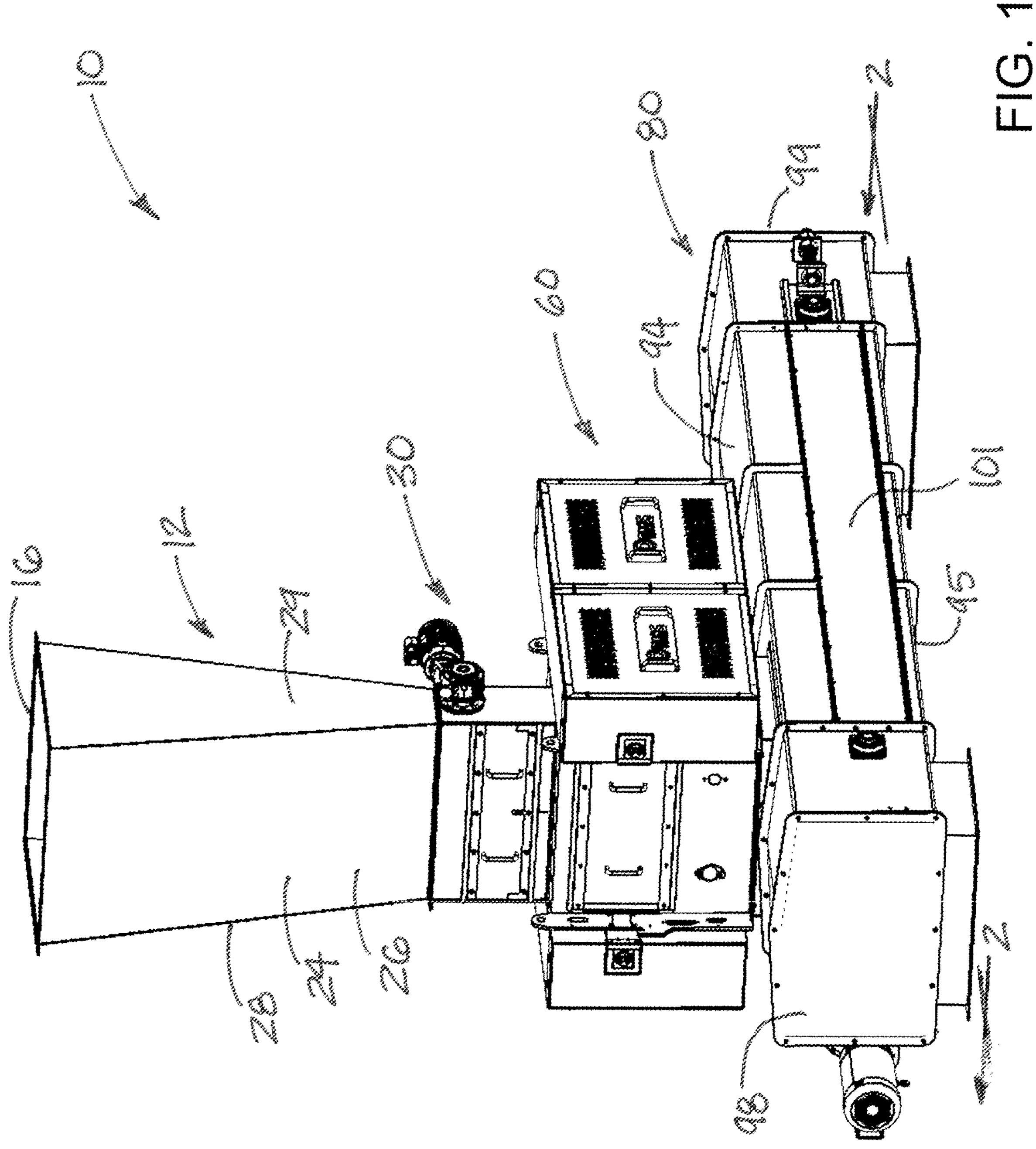
FIG. 1 is a schematic perspective view of a new system for processing cannabis crop materials according to the present disclosure.
Figure 2:
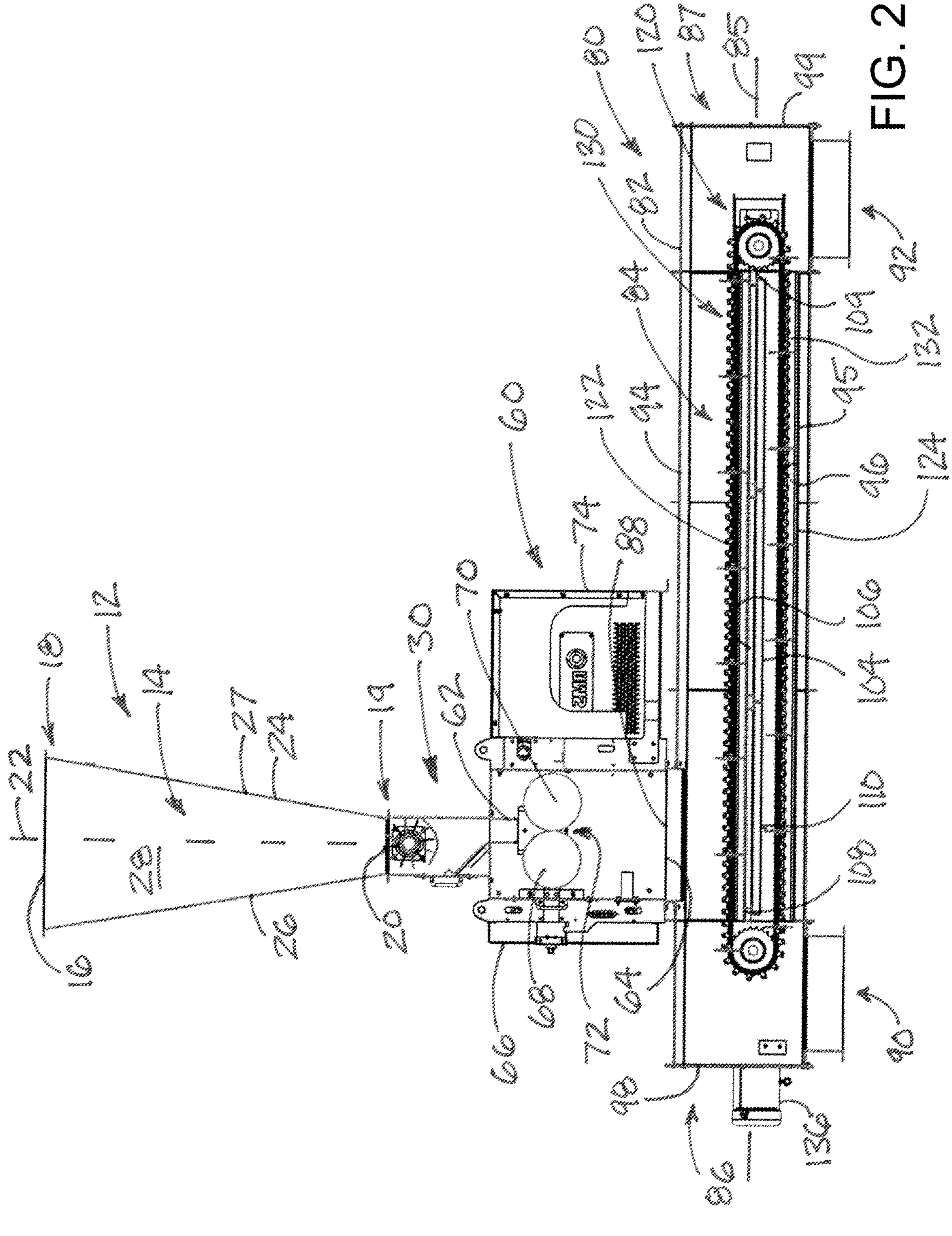
FIG. 2 is a schematic sectional view of the system taken along line 2-2 of FIG. 1, according to an illustrative embodiment.
Figure 3:
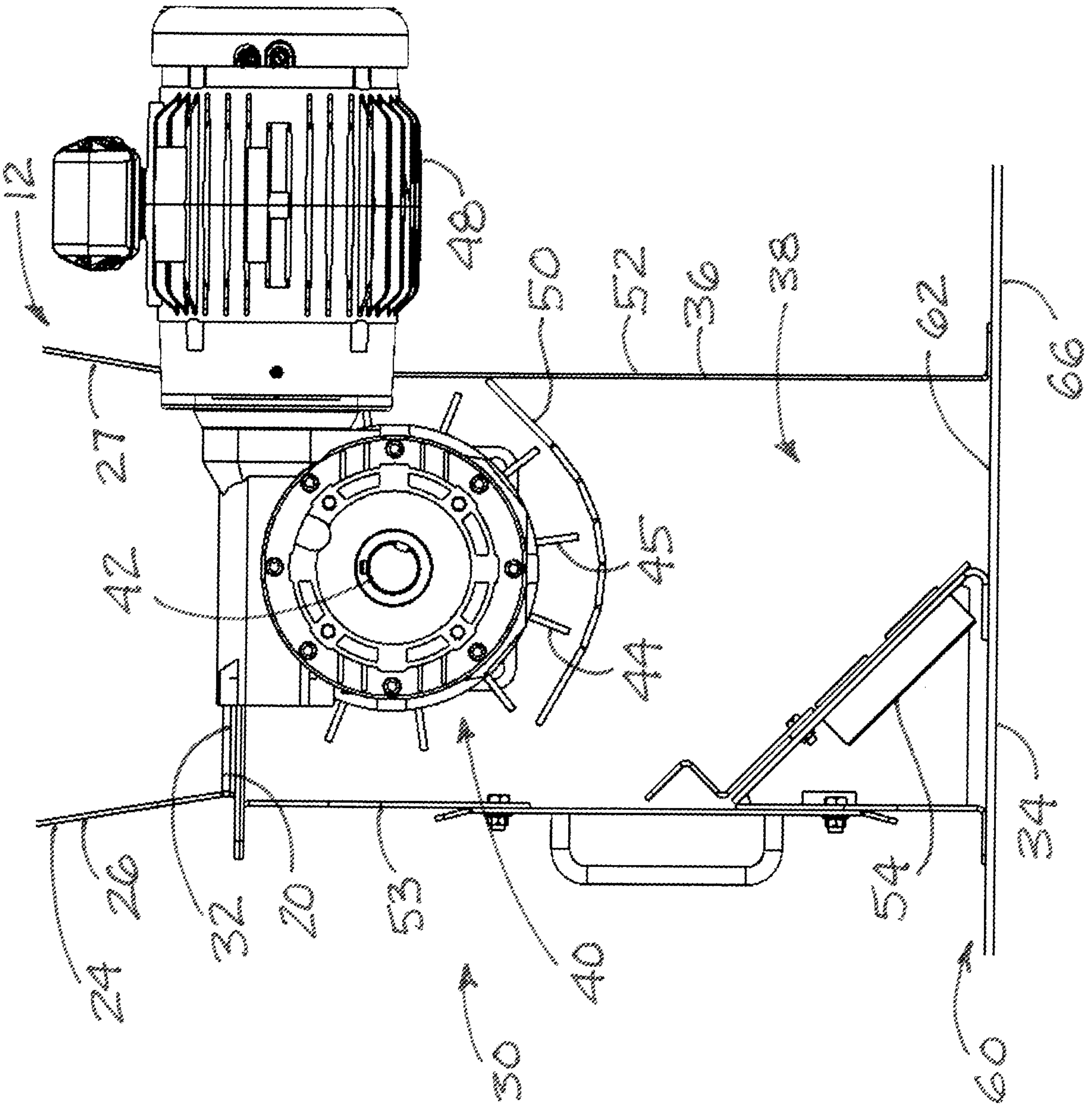
FIG. 3 is a schematic side sectional view of a portion of the system including the feed apparatus, according to an illustrative embodiment.
Figure 4:
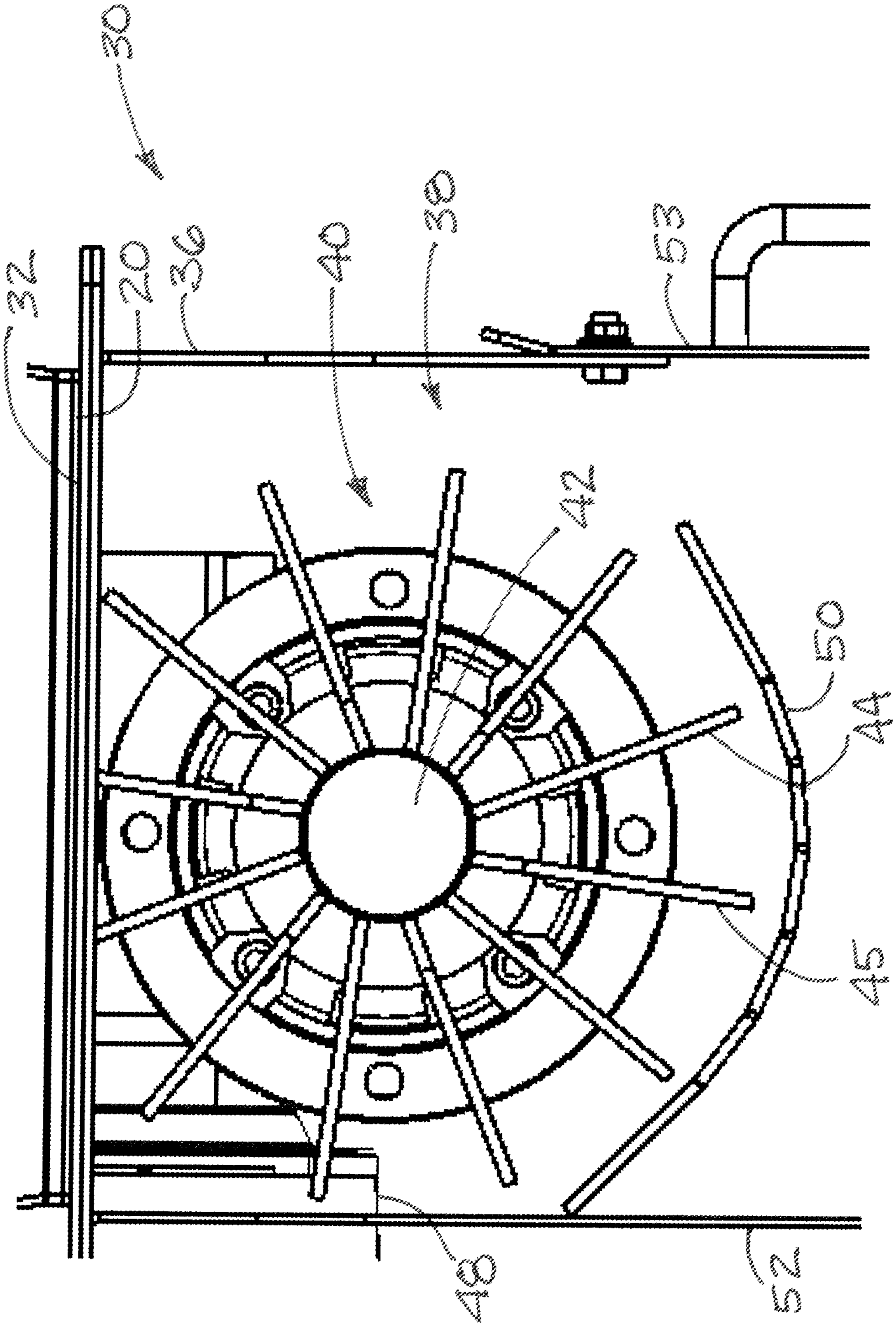
FIG. 4 is a schematic side view of selected elements of the feed apparatus of the system, according to an illustrative embodiment.
Figure 5:
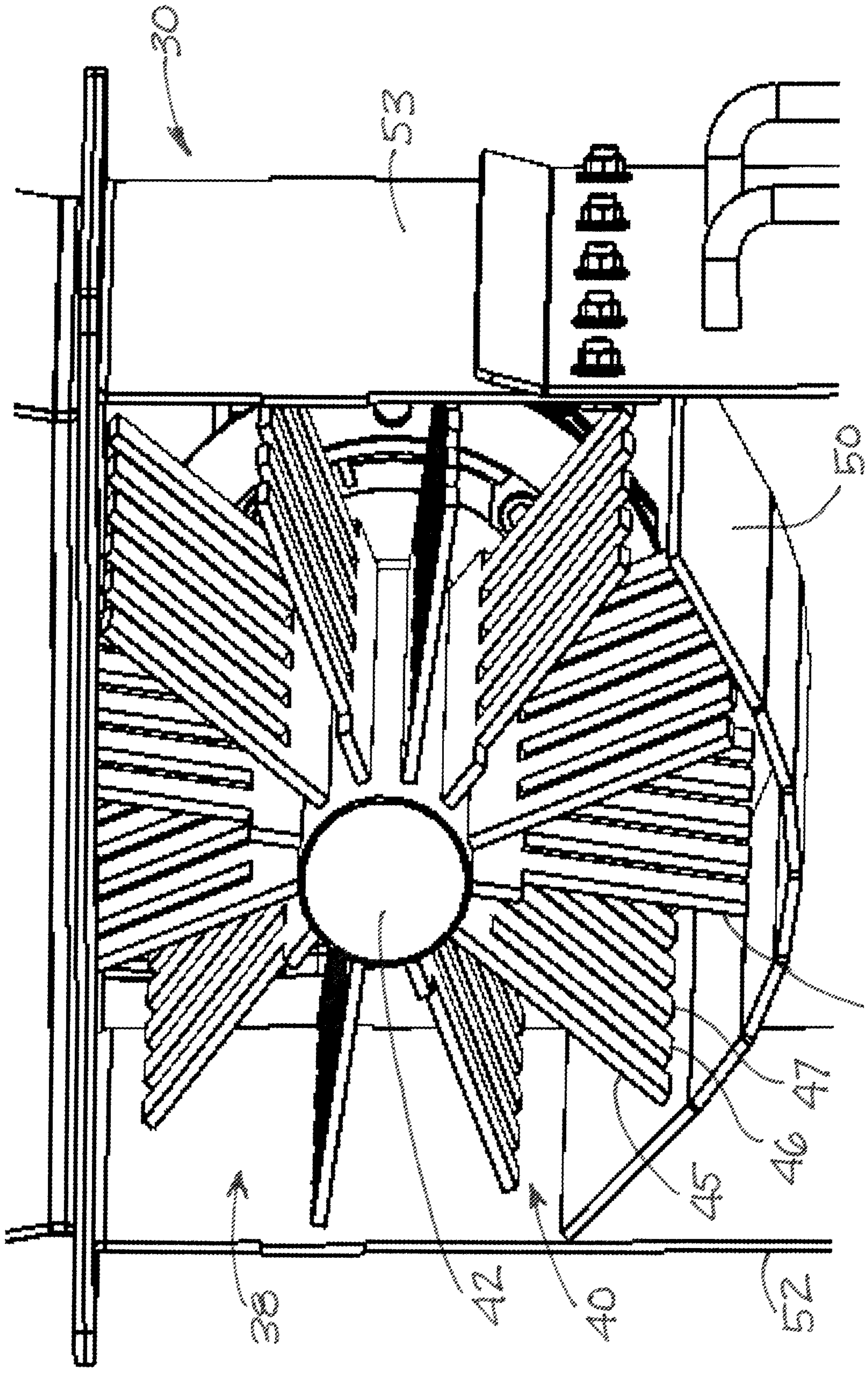
FIG. 5 is a schematic perspective view of the selected elements shown in FIG. 5, according to an illustrative embodiment.
Figure 6:
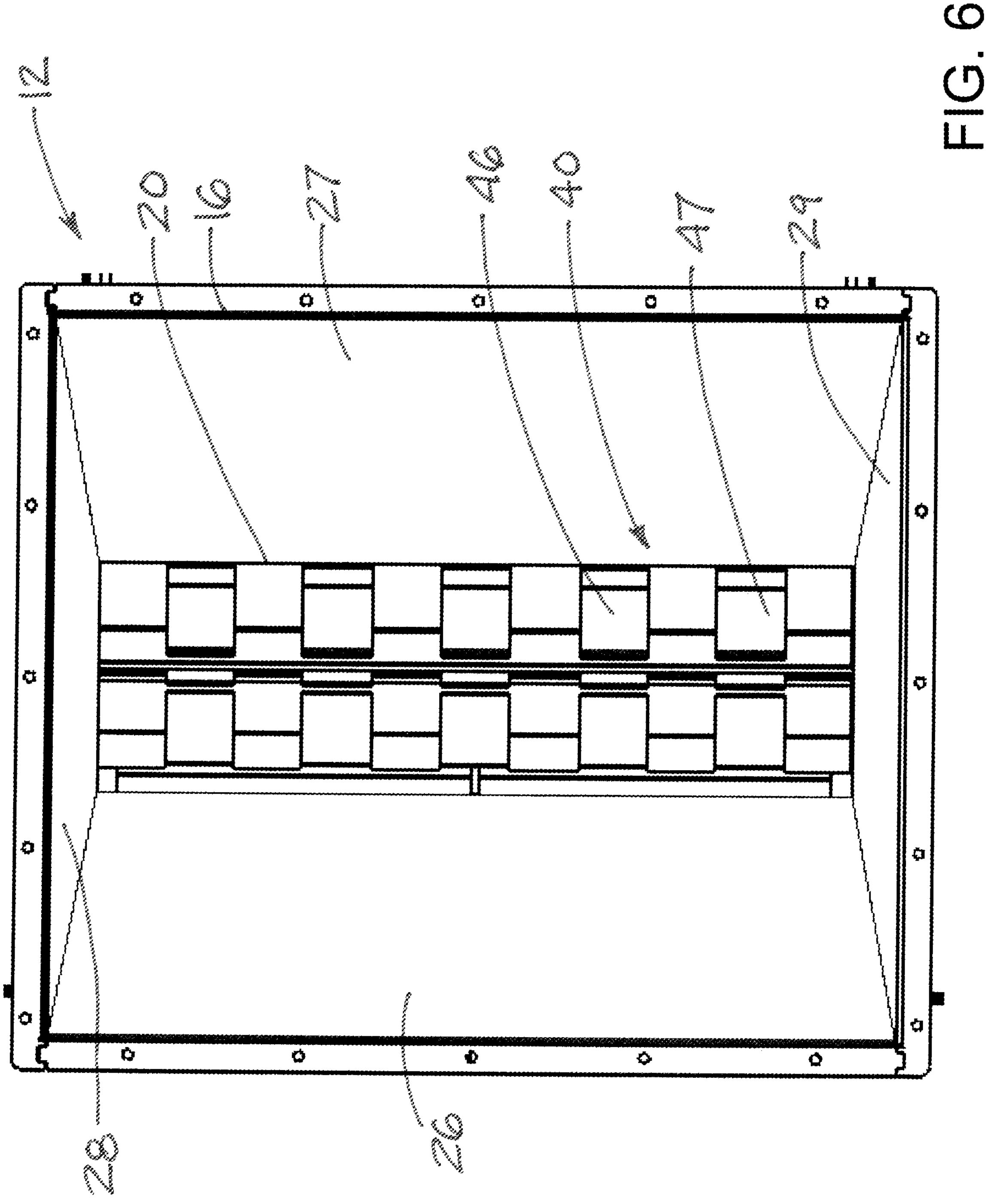
FIG. 6 is a schematic top view of the feed hopper and feed apparatus shown through the feed opening of the feed hopper, according to an illustrative embodiment.
Figure 7:
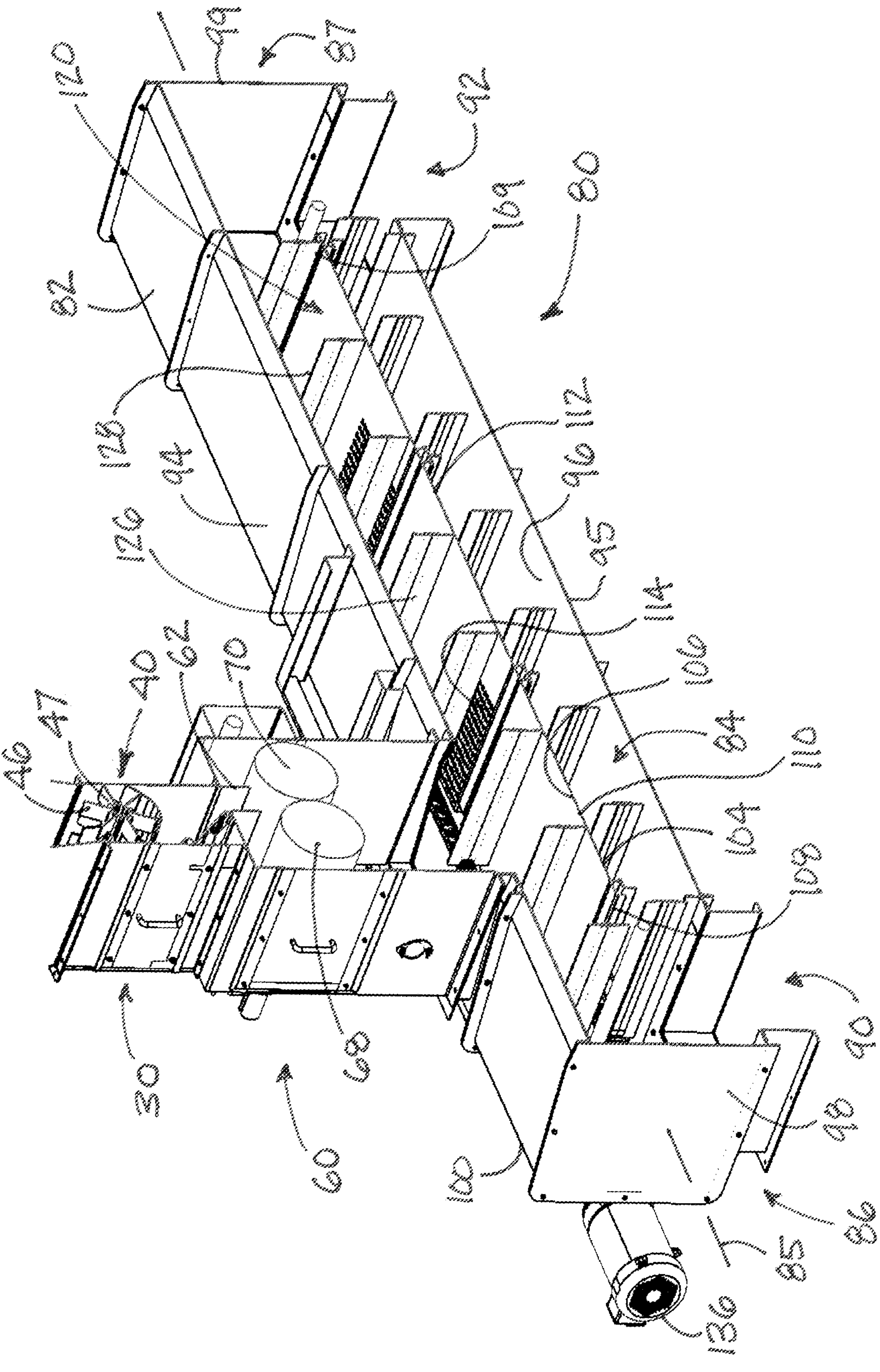
FIG. 7 is a schematic perspective sectional view of a portion of the system taken along line 2-2 of FIG. 1 with elements removed to reveal detail, according to an illustrative embodiment.

With reference now to the drawings, and in particular to FIGS. 1 through 7 thereof, a new system for processing cannabis crop materials embodying the principles and concepts of the disclosed subject matter will be described.

The applicants have recognized that the harvest of some crops, such as cannabis, can include several different parts of the cannabis plants including leaves, buds stalks, stems, etc., not all of which are desirable and useful in certain processes. Thus, there may be an advantage to separate constitute plant parts having characteristics that are more significant to those processes from other parts lacking those characteristics. For example, parts of the plant containing higher levels of a particular or desired extract may be more desirable than plant parts that have lesser levels or substantially no level of the extract, if the outcome of the process is to produce that extract. One example of a desired extract from cannabis plant material is cannabidiol (CBD).

The applicants have recognized that harvesting techniques that chop or grind the entirety of the plant into smaller pieces for further processing tend to dilute the constituent parts of the plant material that have higher levels of the extract or substance sought from the processing, with the constituent parts of the plant material that have lesser or no level of the desired extract. More specifically, in the case of CBD oil extraction from cannabis plant material, chopping or grinding the whole plant creates a mixture of the plant buds which typically have a relatively higher CBD content with the stems and stalks of the plant material which typically have little if any CBD content. Thus, chopping the plant material into a mixture of the buds and the stems and stalks can greatly reduce the processing efficiency of the plant material for an extract such as CBD because the chopped mixture has a significant content of plant parts which yield little or no CBD.

As a result, the applicants have recognized that while grinding whole plants or large portions of the plants both having and not having significant content of the desired extract may be performed, further processing of the ground plant materials in order to separate those parts of the plant material having significant levels of the desired extract from those parts of the plant material having lesser or insignificant levels of the desired extract is a highly preferable step in the overall processing of the plant material to obtain the extract.

Such processing may include disassociating at least some constituent parts of the plant material from other constituent parts of the plant material by, for example, separating or sorting at least some constituent parts of the plant material from other constituent parts so that constituent parts with greater concentration or availability of the desired substance may receive further processing such as techniques for obtaining the desired extract. In the case of processing cannabis plant material to obtain CBD, this may include separating ground buds of the plant material from ground stalks and stems of the plant material.

The applicants of also recognize that grinding the constituent parts of the plant material may cause the surface area of the pieces of plant stems and plant stalks to increase in size while causing the surface area of the pieces of plant buds and plant flowers to decrease in size. The differential in size of the surface area of these plant material pieces facilitates the separation of the material using, for example, an apparatus which utilizes a screen with suitably-sized holes and a paddle mechanisms used to move the ground plant material across the screen.

The applicants have developed a system for processing these elements that may perform grinding the harvested plants and separating the useful parts of the plants from the parts that are not useful. Thus, in one aspect, the disclosure relates to a system 10 for grinding material in a material flow moving through the system, and may also perform other processing upon the material of the material flow.

In greater detail, the system 10 may include a feed hopper 12 having an interior 14 for receiving material to be processed by the system. The feed hopper 12 may have a feed opening 16 which is in communication with the interior 14 and through which material is received into the interior as an initial part or point of the material flow. The feed opening 16 may be located at an upper end 18 of the feed hopper. The feed hopper 12 may also have a dispensing opening 20 through which material located in the hopper interior 14 is dispensed from or otherwise exits the interior. The dispensing opening 20 may be located at a lower end 19 of the feed hopper. The feed hopper may have a longitudinal axis 22 extending between the upper 18 and lower 19 ends, and in some embodiments the axis 22 may be substantially vertically oriented such that the influence of gravity on the material assists movement of the material flow in a downward direction from the feed opening 16 to the dispensing opening 20.

The feed hopper 12 may have a perimeter wall 24 which extends between the upper feed opening 16 and the lower dispensing opening 20. Illustratively, the perimeter wall 24 may include a pair of opposite major wall portions 26, 27 and a pair of opposite minor wall portions 28, 29 with the major wall portions being relatively wider than the minor wall portions. The perimeter wall 24 may define a width of the hopper interior 14 which may be measured in a direction oriented substantially perpendicular to the longitudinal axis 22 of the hopper and between the major wall portions 26, 27. The width of the hopper interior may taper narrower from the upper end 18 toward the lower end 19 to assist in the gathering of the material of the material flow. Optionally, structure may be included to facilitate movement of the material in the hopper in a downward direction by discouraging bridging of the material between the sides of the hopper. For example, a vibration structure may be act on the feed hopper to vibrate walls of the feed hopper to facilitate material movement in the hopper. As a further option, structure may be included to lower the temperature of the material prior to further processing. For example, a gas such as nitrogen may be injected into the hopper interior 14 to contact and lower the temperature of the material.

The system 10 may also include a feed apparatus 30 which is configured to receive the material of the material flow from the feed hopper 12 and may facilitate control of a feed rate of the material in the material flow through the system. The feed apparatus 30 may include a feed input opening 32 and a feed output opening 34, with the feed input opening being in communication with the dispensing opening 20 of the feed hopper which may permit the material in the hopper interior 14 to flow under the influence of gravity out of the hopper and into the initial stages of the feed apparatus. The feed apparatus may include a feed apparatus housing 36 which defines a feed housing interior 38 as well as the input opening 32 and the output opening 34. Illustratively, the feed input opening 32 may be substantially vertically aligned above the feed output opening 34 to facilitate generally vertical movement of the material in the material flow through the feed apparatus under the influence of gravity.

The feed apparatus 30 may also include a feed rotor 40 which is positioned in the feed housing interior 38 and rotates to move material through the interior 38 at a controlled rate. The feed rotor 40 may include a rotating shaft 42 which is rotatably mounted on the feed apparatus housing 36 at a location generally between the input 32 and output 34 openings. A plurality of vanes 44, 45 may extend outwardly from the rotating shaft 42 to rotate with the shaft with respect to the feed apparatus housing. Illustratively, the vanes may be substantially equally circumferentially spaced on the shaft 42. At least one of the vanes may be furcated into a plurality of tines 46, 47 and each of the tines of a vane may be spaced from at least one adjacent time of the vane such that the tines alternate with spaces on the vane. In some illustrative embodiments, the plurality of vanes may include approximately 10 vanes to approximately 15 vanes on the rotor 40, and the plurality of tines may include approximately 5 tines to approximately 10 tines, although other suitable vane and tine configurations may be utilized based upon, for example, the size of the rotor. Advantageously, the vanes and tines of the rotor increase the ability of the rotor to grab and pull material from the hopper.

The feed apparatus may also include a feed motor 48 mounted on the feed apparatus housing and connected to the rotating shaft 42 in a manner that permits the feed motor to rotate the rotating shaft 42 with respect to the housing. Suitable controls for controlling the speed of the feed motor, as well as suitable sensors for detecting the presence and rate of movement of the material through the feed apparatus may also be utilized.

A deflection wall 50 may be positioned below the feed rotor 40 and may extend from one wall 52 of the feed apparatus housing 36 toward an opposite wall 53 of the housing 36 with a gap being formed between the free average of the deflection wall and the wall 53 to permit passage of the material through the gap. The deflection wall 50 may be curved to extend about some of the lowermost vanes on the rotor. In some embodiments, a magnetic structure or magnet 54 may be positioned in the feed housing interior 38 in a location suitably close to the material and the material flow to pick up metallic debris contained within the material flow. The magnet may be located, for example, below the gap formed by the wall 50

The system 10 may also include a roller mill apparatus 60 which is configured to receive material from the feed apparatus 30 and grind the material in the material flow passing through the roller mill apparatus. The mill apparatus 60 may have a roller mill input opening 62 and a roller mill output opening 64. In some embodiments, the roller mill apparatus may be positioned below the feed apparatus to receive material discharged by the feed apparatus from the feed output opening 34, and the roller mill input opening 62 may be in communication with the feed output opening 34 of the feed apparatus.

The roller mill apparatus 60 may include a roller mill frame 66 which may define the roller mill input 62 and output 64 openings which may be substantially vertically aligned with each other to facilitate the substantial vertical movement of the material flow through the roller mill apparatus. The roller mill apparatus may also include a pair of mill rolls 68, 70 which are mounted on the roller mill frame 66 for rotation about substantially parallel rotation axes and may be positioned adjacent to each other in a manner defining a gap 72 between the rolls for passage of the material of the material flow therebetween. In some embodiments, the width of the gap between the pair of mill rolls 68, 70 may be adjustable through movement of one or both of the mill rolls with respect to the mill frame. Further, at least one, and in some embodiments both, of the mill rolls have a plurality of teeth formed thereon which may extend in a longitudinal direction of the mill roll. Illustratively, the plurality of teeth may be oriented substantially parallel to each other and may be parallel to the rotation axis. Illustratively, the teeth may be substantially continuous between the opposite longitudinal ends of one or both of the mill rolls. A mill roll motor 74 may be suitably connected to at least one of the mill rolls to rotate the mill roll, and typically the motor 74 is connected to both mill rolls to rotate both rolls. It should also be recognized that although the illustrative embodiments include a single pair of rolls, additional pairs of rolls may be utilized in a serial arrangement. Also, in addition to the illustrative cylindrical mill rolls, other forms of milling devices may be used, such as, for example, a disk or attrition mill in which material is ground between two disks, at least one of which rotates.

The system 10 may also include a classifier apparatus 80 which is configured to move certain portions of the material from the material flow, and may create a flow of process material for further processing or use, and a flow of waste material to be, for example, discarded as waste. The classifier apparatus 80 may include a classifier housing 82 which defines a classifier housing interior 84. The classifier housing may be elongated with a longitudinal axis 85 which extends between a first end 86 and a second end 87 of the elongated housing. The classifier housing may define a reception opening 88 for receiving material of the material flow passed out of the roller mill apparatus, and the reception opening may be in communication with the roller mill output opening 64 to receive the flow. The classifier housing 82 may also define a first exit opening 90 through which material to be utilized or receive other processing exits the classifier housing, and also defines a second exit opening 92 through which material not to be utilized (e.g., discarded) exits the classifier housing. The first exit opening 90 may be located toward the first end 86 of the housing 82, while the second exit opening 92 may be located toward the second end 87 of the housing. The classifier housing 82 may also include an upper wall 94 in which the reception opening 88 is formed, and a lower wall 95 which has a top surface 96. Further, the classifier housing may have a pair of opposite end walls 98, 99 and a pair of opposite side walls 100, 101 which extend between the end walls as well as the upper 94 and lower 95 walls.

The classifier apparatus 80 may also include a material support 104 which is positioned in the classifier housing interior 84 and may extend between the first exit opening 90 and the second exit opening 92. The material support 104 may have an upper surface 106. The material support may have a first support end 108 which is located proximate to the first exit opening 90 and a second support end 109 which is located proximate to the second exit opening 92. The material support may also extend from one 100 of the opposite side walls to another one 101 of the opposite side walls.

In some embodiments, the material support 104 may include a support plate 110 which may be substantially solid and continuous without openings or holes of any practical significance. The support plate 110 may be located below the reception opening 88 such that material of the material flow entering the housing interior 84 and falling to the support 104 falls upon the support plate. The support plate 110 may be located proximate to the first support end 108 of the support 104 and may extend from the first support and toward the second support end.

The material support 104 may also include at least one support grate 112 having a plurality of holes 114 formed therein through which material of a predetermined size or smaller or a particular character is able to move through. The support grate 112 may be positioned adjacent to the support plate 110 and may extend from the support plate toward the second support end 109 and may further extend the entire distance from the support plate to the second support end. The support grate 112 may be positioned above the lower wall 95 of the classifier housing such that material passing through the holes 114 of the support grate tend to land on the top surface 96 of the lower wall.

The classifier apparatus 80 may also include a scraper assembly 120 for removing material entering the classifier apparatus along the material support 104, and may be configured to contact the material support to move the material along the material support. The scraper assembly 120 may also move material having passed through the material support toward the first exit opening 90 of the classifier housing 82, and may be configured to contact the top surface 96 of the lower wall 95 of the housing to move material resting on the lower wall toward the first exit opening. The scraper assembly 120 may be configured to move material on the material support 104 from a location below the reception opening 88 of the classifier housing toward a location above the second exit opening 92. The scraper assembly may have an upper extent 122 and a lower extent 124, and the upper extent may be positioned over or above the material support and may contact the upper surface 106 of the material support. The lower extent 124 may be positioned over the lower wall 95 of the classifier housing, and may contact the top surface 96 of the lower wall. The material support 104 may be positioned between the upper 122 and lower 124 extents of the scraper assembly.

In some embodiments, the scraper assembly 120 may include at least one scraper 126 which is movable across the material support 104 and may extend across the material support with a length that may be substantially equal to the width of the material support between the first 100 and second 101 side walls of the housing. The scraper 126 may be movable in a direction that is substantially parallel to the longitudinal axis 85 of the housing 82, and the scraper may be oriented substantially perpendicular to the longitudinal axis. The scraper may have a panel with a relatively thin thickness dimension and may be formed of a resiliently flexible material, although materials with other characteristics may also be suitable. In the most preferred embodiments, a plurality of scrapers 126, 128 may be employed to perform the material movement functions.

This scraper assembly may also include a carrier structure 130 which may carry the scraper or scrapers 126, 128 across the material support, and also across the lower wall of the classifier housing. The carrier structure 130 may be located in the classifier housing interior 84. The carrier structure 130 may include at least one chain loop 132 and typically may include a pair of chain loops which are positioned substantially parallel to each other and each may be oriented in a substantially vertical plane oriented substantially perpendicular to the upper surface 106 of the material support. The scrapers may be attached to the chain loops such that each scraper bridges between the chain loops. A scraper motor 136 may be configured to operate the carrier structure, and for example may rotate one or both of the chain loops of the carrier structure.

In use, crop materials may be processed by the system that may be dried to some degree but may be green and may have various moisture levels, and illustratively may have moisture contents from approximately 5 percent to approximately 20 percent, and may have moisture content of approximately 10 percent to approximately 15 percent.

In testing of plant materials processed using aspects of the system 10, it has been observed that the cannabinoid potency obtained may approximately double when moving from extraction from substantially whole plant materials to extraction from plant materials having been processed (e.g., separated out) utilizing elements of the system 10

In plant material separated utilizing the system 10 as compared to the plant material separated manually by hand shucking, no significant difference in the cannabinoid potency has been observed. See TABLE 1 below

TABLE 1

| | Total THC Potency | Total CBD Potency | Total Cannabinoid Potency |
|---|---|---|---|
| Hand Shucked Test 1 | 0.505% | 9.197% | 9.797% |
| Hand Shucked Test 2 | 0.479% | 9.452% | 10.025% |
| System Test 1 | 0.392% | 9.089% | 9.567% |
| System Test 2 | 0.417% | 9.376% | 9.866% |

The lack of any significant variance between the cannabinoid potency in hand separated or shucked plant materials and plant materials processed by the system 10 is believed to demonstrate that there is no significant loss of the trichomes during processing the plant materials utilizing elements of the system 10, and is also believed to demonstrate that processing of plant materials by elements of the system 10 does not raise the temperature of the processed plant material enough to cause decarboxylation of the cannabinoids which can negatively impact effective extraction of the cannabinoids from the plant materials.

Further, processing utilizing elements of the system 10 decreases the particle size of the plant materials which tends to increase the packing density of the processed plant materials, and may facilitate packing of a greater amount of plant materials into a vessel utilized for further processing, such as may be utilized in supercritical CO2 extraction techniques.

It should be appreciated that in the foregoing description and appended claims, that the terms “substantially” and “approximately,” when used to modify another term, mean “for the most part” or “being largely but not wholly or completely that which is specified” by the modified term.

It should also be appreciated from the foregoing description that, except when mutually exclusive, the features of the various embodiments described herein may be combined with features of other embodiments as desired while remaining within the intended scope of the disclosure.

In this document, the terms “a” or “an” are used, as is common in patent documents, to include one or more than one, independent of any other instances or usages of “at least one” or “one or more.” In this document, the term “or” is used to refer to a nonexclusive or, such that “A or B” includes “A but not B,” “B but not A,” and “A and B,” unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A system for grinding material in a flow of material moving through the system, the system having a top and a bottom with the flow of material from the top to the bottom, the system comprising:

- a feed receiver at the top of the system having an interior for receiving material in the flow of material to be processed;
- a feed apparatus configured to receive material in the flow of material from the feed receiver, the feed apparatus being configured to control a feed rate of the flow of material moving out of the receiver and through the system;
- a roller mill apparatus configured to grind material of the flow of material received by the roller mill apparatus from the feed apparatus; and
- a classifier apparatus receiving ground material of the flow of material from the roller mill apparatus and being configured to separate a portion of the flow of material to create a flow of process material at the bottom of the system for further processing from other portions of the flow of material to create a flow of waste material at the bottom of the system;

wherein the classifier apparatus includes:

- a classifier housing defining a classifier housing interior and being elongated with a first end and a second end;
- a material support being positioned in the classifier housing interior and extending between the first and second ends of the classifier housing, at least a portion of the material support comprising a support grate having a plurality of holes formed therein through which material of a predetermined size or smaller is able to move through; and a scraper assembly for moving material entering the classifier apparatus along the material support.

2. The system of claim 1 wherein a direction of material movement in the flow of material through the feed receiver, feed apparatus, and roller mill apparatus is vertical.

3. The system of claim 2 wherein the direction of material movement in the flow of material through the classifier apparatus is horizontal.

4. The system of claim 1 wherein the feed apparatus includes a feed apparatus housing defining a feed apparatus interior; and a feed rotor positioned in the feed housing interior and being mounted on the feed housing in a manner permitting rotation of the feed rotor to move material through the feed housing interior, the feed rotor comprising:

a rotating shaft rotatably mounted on the feed apparatus housing; and a plurality of vanes extending outwardly from the rotating shaft to rotate with the shaft with respect to the feed apparatus housing.

5. The system of claim 4 wherein the feed apparatus additionally comprises a feed motor mounted on the feed apparatus housing and being connected to the rotating shaft in a manner permitting the feed motor to rotate the rotating shaft with respect to the feed apparatus housing to control the material flow from the feed receiver to the roller mill apparatus.

6. The system of claim 4 wherein the feed apparatus includes a deflection wall positioned below the feed rotor to encourage the flow of material over the deflection wall toward a magnetic structure positioned in the feed housing interior configured to pick up metallic debris contained in the material flow.

7. The system of claim 1 wherein the roller mill apparatus comprises:

a roller mill frame; and a pair of mill rolls mounted on the roller mill frame for rotation about substantially parallel rotation axes and being positioned adjacent to each other in a manner defining a gap therebetween for the passage of the particulate material.

8. The system of claim 7 wherein the roller mill apparatus is configured such that a width of the gap between the pair of mill rolls is adjustable.

9. The system of claim 7 wherein at least one of the mill rolls has a plurality of teeth, the teeth extending in a longitudinal direction with respect to the mill roll in an orientation parallel to the rotation axis.

10. The system of claim 9 wherein the teeth on the mill roll are continuous between opposite longitudinal ends of the mill roll.

11. The system of claim 1 wherein the material support includes a support plate being solid and continuous, the support plate being located below a reception opening of the classifier housing and the support grate of the material support.

12. The system of claim 1 wherein the scraper assembly is configured to contact the material support to move the material along the material support.

13. A system for grinding material in a flow of material moving through the system, the system having a top and a bottom with the flow of material from the top to the bottom, the system comprising:

a feed receiver at the top of the system having an interior for receiving material in the flow of material to be processed;

a feed apparatus configured to receive material in the flow of material from the feed receiver, the feed apparatus being configured to control a feed rate of the flow of material moving out of the feed receiver and through the system;

a roller mill apparatus configured to grind material of the flow of material received by the roller mill apparatus from the feed apparatus;

a classifier apparatus receiving ground material of the flow of material from the roller mill apparatus and being configured to separate a portion of the flow of material to create a flow of process material at the bottom of the system for further processing from other portions of the flow of material to create a flow of waste material at the bottom of the system;

wherein the feed apparatus includes a feed apparatus housing defining a feed apparatus interior;

a feed rotor positioned in the feed housing interior and being mounted on the feed housing in a manner permitting rotation of the feed rotor to move material through the feed housing interior, the feed rotor comprising:

a rotating shaft rotatably mounted on the feed apparatus housing; and a plurality of vanes extending outwardly from the rotating shaft to rotate with the shaft with respect to the feed apparatus housing; and wherein at least one of the vanes of the feed rotor is furcated into a plurality of tines, each of the tines of one of the vanes being spaced from an adjacent other one of the tines of the one of the vanes.

14. A system for grinding material in a flow of material moving through the system, the system comprising:

a feed hopper having an interior for receiving material in the material flow to be processed;

a feed apparatus configured to receive material in the flow of material from the feed hopper, the feed apparatus being configured to control a feed rate of the flow of material moving through the system;

a roller mill apparatus configured to grind material of the flow of material passing through the roller mill apparatus; and a classifier apparatus configured to remove portions of the flow of material from other portions of the flow of material;

wherein the classifier apparatus includes:

a classifier housing defining a classifier housing interior and being elongated with a first end and a second end;

a material support being positioned in the classifier housing interior and extending between the first and second ends of the classifier housing, at least a portion of the material support comprising a support grate having a plurality of holes formed therein through which material of a predetermined size or smaller is able to move through; and a scraper assembly for moving material entering the classifier apparatus along the material support; and wherein the scraper assembly includes:

at least one scraper being movable across the material support; and a carrier structure carrying the at least one scraper across the material support and carrying the at least one scraper across a lower wall of the classifier housing.

15. The system of claim 1 wherein the feed receiver comprises a feed hopper which is elongated along a longitudinal axis extending between an upper end and a lower end of the receiver, the longitudinal axis being vertically oriented with a dispensing opening of the feed receiver being located at the lower end such that gravity acting on the material assists movement of the flow of material through the dispensing opening to the feed apparatus.

16. The system of claim 15 wherein the feed hopper has a perimeter wall extending between an upper feed opening and the dispensing opening, the feed hopper having a width measured between opposite locations on the perimeter wall, the width tapering uniformly narrower between the upper feed opening and the dispensing opening.

17. The system of claim 14 wherein the material support includes a support plate being solid and continuous, the support plate being located below a reception opening of the classifier housing and the support grate of the material support.

18. The system of claim 14 wherein the scraper assembly is configured to contact the material support to move the material along the material support.

19. The system of claim 14 wherein a direction of material movement in the flow of material through the feed hopper, feed apparatus, and roller mill apparatus is vertical; and wherein the direction of material movement in the flow of material through the classifier apparatus is horizontal.

20. The system of claim 14 wherein the roller mill apparatus comprises:

a roller mill frame; and a pair of mill rolls mounted on the roller mill frame for rotation about substantially parallel rotation axes and being positioned adjacent to each other in a manner defining a gap therebetween for the passage of the particulate material.

* * * * *